3,456,954
COMPRESSION PISTON RING ASSEMBLY
Herbert F. Prasse, Town and Country, Mo., and Donald J. Mayhew, Flora, Ill., assignors to Ramsey Corporation, St. Louis, Mo., a corporation of Ohio
Continuation-in-part of application Ser. No. 489,477, Sept. 23, 1965. This application Feb. 19, 1968, Ser. No. 706,479
Int. Cl. F16j 9/06, 9/12, 9/02
U.S. Cl. 277—169                                    3 Claims

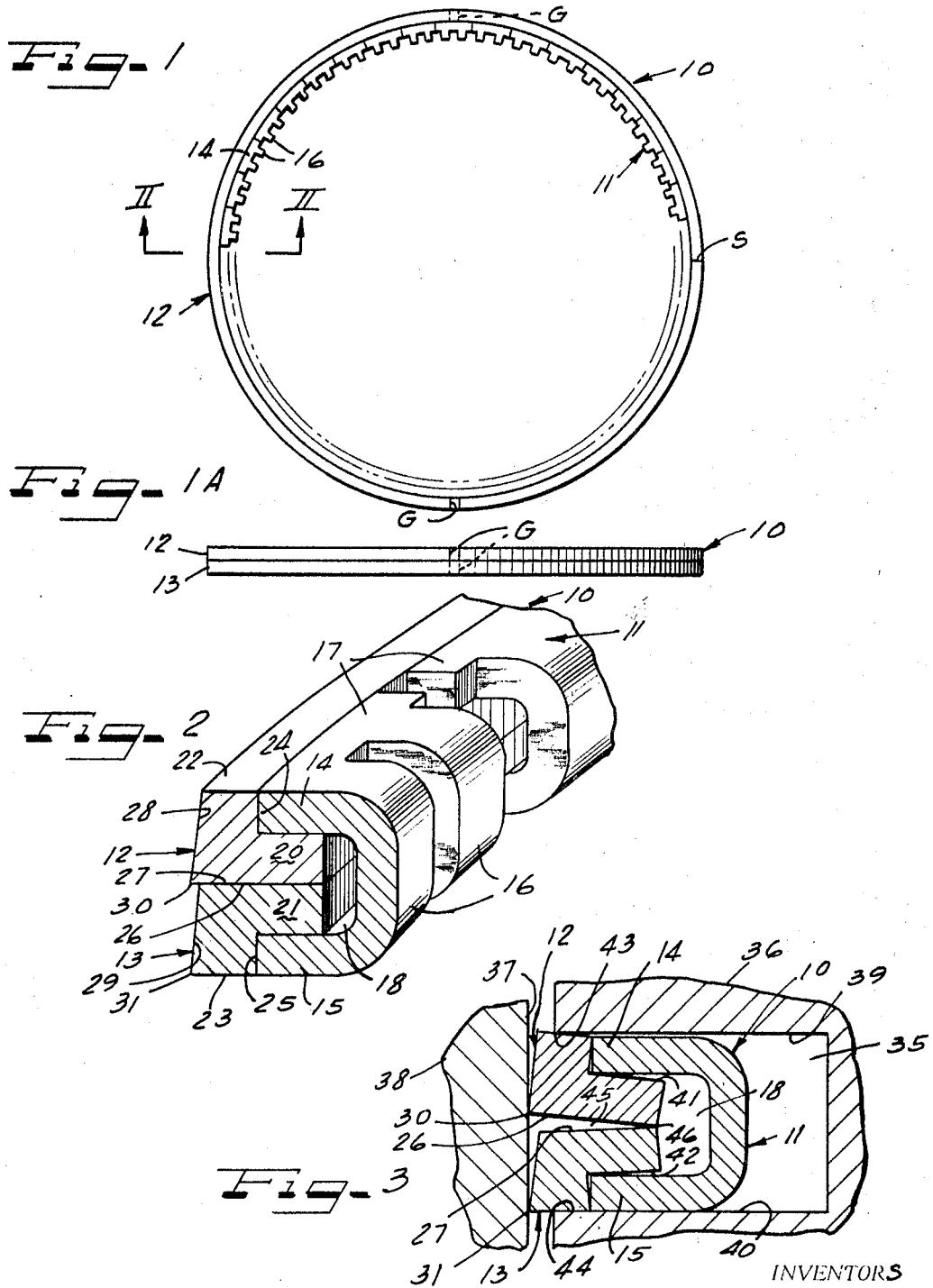

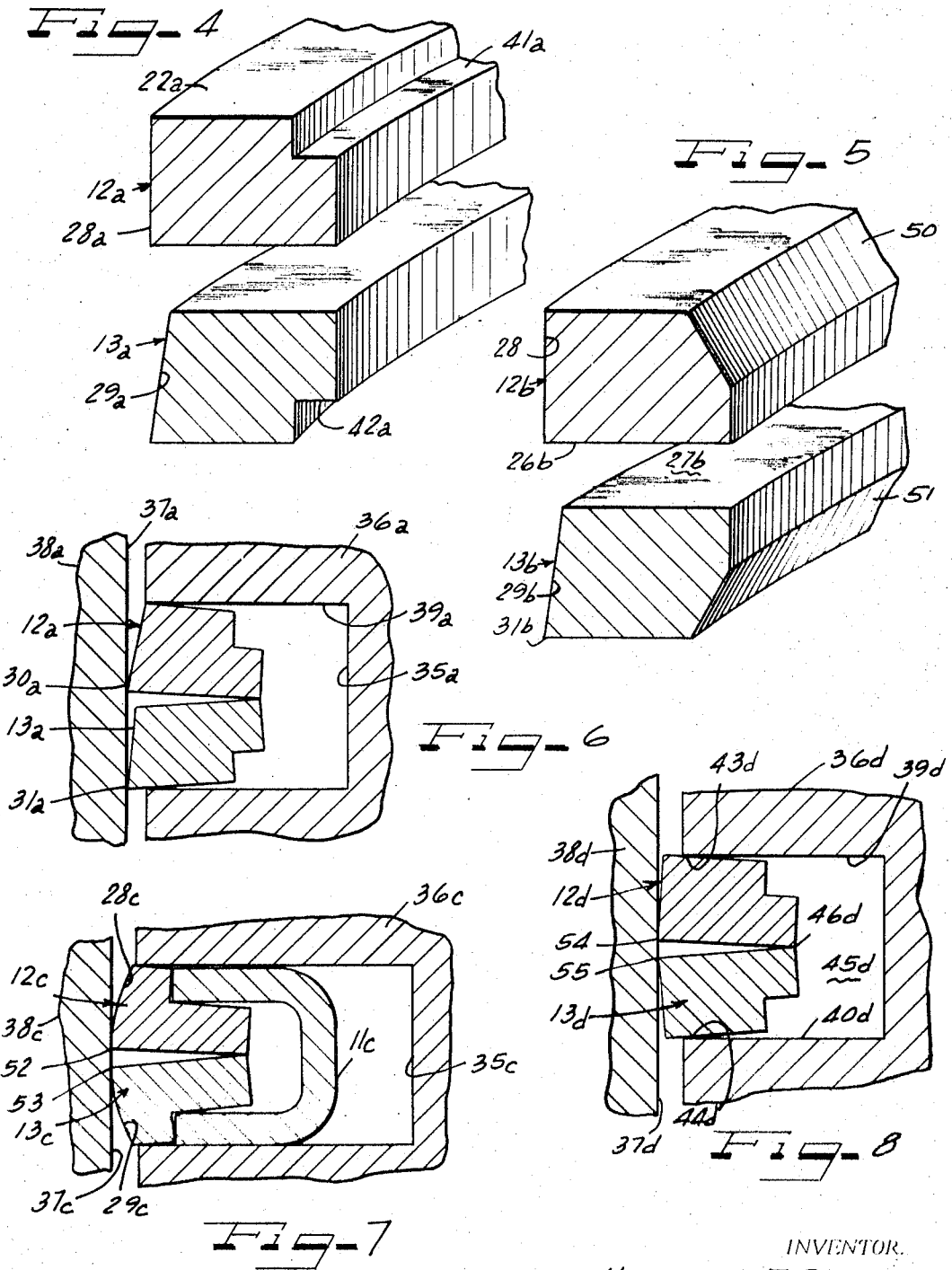

ABSTRACT OF THE DISCLOSURE

A compression piston ring assembly for mounting in the upper groove of a piston for operation in a cylinder bore of an internal combustion engine, wherein the piston ring assembly consists essentially of a pair of superimposed piston ring segments so arranged and constructed as to provide edgewise line contact with the cylinder wall and an effective sealing against the upper and lower radial walls of the groove at or near the outer periphery thereof to thereby prevent or reduce blowby. To accomplish this and to effect good oil control, the lower of the piston ring segments that engage the wall of the cylinder bore preferably has an outer peripheral surface that is initially tapered or sloping to effect line control with the cylinder wall. In general, both the upper and lower ring segments of each pair of segments have outer peripheral surfaces that are tapered in the same or in opposite directions, as a result of the use of ring segments that are unbalanced in cross-section to cause twisting or dishing of the ring segments when contracted to a truly cylindrical form. Substantial edge contact between the outer faces of the ring segments and the cylinder wall is also accomplished satisfactorily if both of the respective ring segments of an assembly are straight-faced and twisting and dishing is brought about by a combination of reverse torsion rings in the same assembly.

BACKGROUND OF THE INVENTION

The present invention is a continuation-in-part of our application Ser. No. 489,477, filed Sept. 23, 1965, and constitutes an improvement over the piston ring described and claimed in U.S. Patent No. 2,729,524, dated Jan. 3, 1956, issued to one of us as patentee.

BRIEF SUMMARY OF THE INVENTION

In accordance with the present invention, our piston ring assembly consists essentially of a pair of superimposed piston ring segments for mounting in the upper groove of the piston of an internal combustion engine, and so arranged and constructed with relation to the dimensions of said groove as to provide sealing against the upper and lower radial walls of the groove at or near the outer periphery thereof. This result is accomplished in a number of ways, in accordance with one of which the outer, cylinder wall-engaging faces of one or both of the piston ring segments are initially tapered or curved, either in the same or in opposite directions or are straight faced, in combination with ring segments that are of an unbalanced cross-section such as causes twisting or dishing of the ring segments, and thereby provides substantially only edge-line contact between the outer faces and the cylinder wall. Where the ring segments of the pair of segments are both straight faced, a combination of positive and reverse torsion rings is preferably used. In all of these types of piston ring assemblies, each of the ring segments has upper and lower planar surfaces, the lower surface of the upper ring segment, when assembled, being in opposed and free-to-abut relation to the upper surface of the lower ring segment, said two surfaces being free within limits to become axially separated toward their outer peripheries when installed in the groove of the piston and the engine is operating.

As in the above cited patent, a spring-hardened sheet metal, flexible, circumferentially expanding U-shaped ring, similar to the ring 10 of that patent can be used for mounting therein the pair of compression ring segments herein disclosed instead of the single ring 12 of the patent. Alternatively, the flexible circumferentially expanding ring can be omitted in accordance with our present invention and the pair of ring segments assembled directly and by themselves in the upper groove of a piston.

It is, then, an object of this invention to provide a compression piston ring assembly which provides sealing against the upper and lower sides of the piston groove at the outer periphery of said groove when installed; that provides good bore conformability and piston groove side sealing; that provides edge sealing at the outer periphery with the cylinder wall, either at the lower edges of the respective pair of ring segments or at the lower and upper edges, respectively, of the upper and lower ring segments of the pair; and that because of the aforesaid features compensates for misalignment of the piston ring groove with respect to the cylinder wall.

Other and further objects of this invention will be apparent to those skilled in the art from the following detailed description of the annexed sheets of drawings, which, by way of preferred example only, illustrate embodiments of our invention, but with features of taper exaggerated for clarity of illustration.

BRIEF DESCRIPTION OF THE DRAWINGS

FIG. 1 is a plan view of a compression piston ring assembly embodying one form of our invention;

FIG. 1A is an edge elevational view of the assembly of FIG. 1;

FIG. 2 is an enlarged fragmentary view taken substantially along the line II—II of FIG. 1;

FIG. 3 is an enlarged fragmentary sectional view, similar to that of FIG. 2, but with the compression piston ring assembly of FIGS. 1 and 2 mounted in an upper groove of a piston and installed within the cylinder of an engine;

FIG. 4 is an enlarged, fragmentary cross-sectional view of a pair of compression ring segments unassembled, consisting of a positive torsion and a reverse torsion piston ring segment in each of which the torsion effect is accomplished by a counter bore toward the radially inward annular portion of the ring segment to give such segment an unbalanced cross-section;

FIG. 5 is an enlarged, fragmentary cross-sectional view of an unassembled pair of modified compression piston ring segments utilizing chamfers instead of counterbores, such as used in FIG. 4, to obtain the unbalance in cross-section which causes the rings to twist, or dish, upon being confined to a truly circular form;

FIG. 6 is a fragmentary cross-sectional view of an assembly of taper faced torsion ring segments within the groove of a piston installed in the cylinder of an internal combustion engine, but without any circumferentially expanding U-ring;

FIG. 7 is a fragmentary, cross-sectional view, similar to FIG. 3 but showing a modified form of compression piston ring assembly for center contact with the cylinder wall consisting of ring segments having arcuate-outer faces segments in association with a flexible circumferentially expanding U-ring; and FIG. 8 is a fragmentary, cross-sectional view, similar to that of FIG. 6, but showing a further modified form of compression piston ring made up of positive and reverse torsion ring segments providing center edge contact with the cylinder wall.

DETAILED DESCRIPTION OF THE DRAWINGS

In FIGS. 1 to 3, inclusive, the compression piston ring assembly, generally indicated by the reference numeral 10, includes an inner spring-hardened, sheet metal, flexible, circumferentially expanding U-shaped piston ring 11 of the type normally used to control oil flow, together with a pair of compression piston ring segments 12 and 13, each preferably formed of solid cast metal, such as normally used for compression rings, with said ring segments 12 and 13 and said flexible circumferentially expanding piston ring 11 in assembled relationship. Said ring 11 is provided with a transverse split, as at S, which is substantially closed, while the ring segments 12 and 13 are provided with splits that result in gaps G, G that are open and circumferentially separated by an angle, preferably, of 180°, from one another. The ring 11 is circumferentially expansible so that, when radially compressed, it forms a loaded spring exerting an equally distributed expanding forced on the pair of ring segments 12 and 13. This expanding force or load acts in a radial direction, and since the ring 11 is very flexible, it can follow any irregularities in the assembly in which it is mounted.

The ring 11 is composed of axially spaced top and bottom flanges 14 and 15, respectively, connected by circumferentially spaced web members 16. The top flange 14 is composed of a plurality of arcuate crowns or segments 17, while the lower flange 15 is composed of similar arcuate crowns or segments (not shown) but in staggered relation to the crowns or segments 17. For further details of the construction of the circumferentially expansible ring 11 reference is made to the aforesaid Patent No. 2,729,524.

Said ring 11 defines a channel 18 that is open at the outer peripheral portion of the U-shaped ring 11. The ring segments 12 and 13 are, in general, L-shaped in cross-section, with the leg portions 20 and 21 of the respective rings poistioned within said channel 18 and with the heads 22 and 23 of said respective ring segments abutting the outer peripheral end faces of said U-shaped ring 11, as at 24 and 25, respectively. The upper segment of the pair of ring segments is provided with a lower planar face 26 and the lower ring segment 13 is provided with an upper planar face 27. When the ring segments 12 and 13 are assembled in the ring 11, prior to installation in a piston groove, the planar surfaces 26 and 27 are in extended surface abutting relationship. When so assembled, if the outer peripheral faces 28 and 29 of the respective ring segments 12 and 13 are provided initially with a taper, the lower outer edge 30 of said upper ring segment 12 extends radially outwardly of and overhangs the outer peripheral face 29 of the lower ring segment 13. The outer peripheral face of said ring segment 13 being similarly tapered to the outer peripheral face of the upper ring segment 12, the lower outer edge 31 of said lower segment 13 lies in the same surface of revolution as that of the edge 30.

However, the outer peripheral 28 and 29 need not have an initial taper since when the compression ring assembly 10 is installed, as illustrated in FIG. 3, in operative relationship within an upper groove 35 of a piston 36 that is operating within a cylinder 37 of an internal combustion engine 38, there is sufficient clearance, or play, between the circumferentially expandable ring 11 and the upper and lower radial surfaces 39 and 40, respectively, of the groove 35, to permit the ring segments 12 and 13 to assume the twisted or cocked positions illustrated in FIG. 3. The tendency of the ring segments 12 and 13 to assume such twisted or "dished" relationship is due to the unbalanced cross-section of said segments that is caused by the counterboring, as at 41 and 42, of said segments 12 and 13, respectively, that brings said segments into a generally L-shape in cross-section. This unbalanced cross-section results in the upper ring segment 12 assuming a twist or "dish" in a clockwise direction, and in the case of the lower ring segment 13, causes that segment to twist in a counterclockwise direction (when viewing FIG. 3). Such twisting causes a seal to be formed between the outer periphery of the piston ring groove 35 at the outer edge of said radial surface 39, as at 43, and also a seal at the outer edge of the lower radial surface 40, as at 44. Additionally, the relative twisting of the ring segments 12 and 13 causes a partial separation of said lower surface 27 and upper surface 26 of the respective rings, as at 45, while leaving said surfaces 27 and 26 still in abutting relation at the rear edges of said respective ring segments, as at 46.

If one or both of the outer peripheral surfaces is initially tapered the net result of the initial tapering and the twisted or dished relationship of the ring segments 12 and 13, when actually installed and in operation (FIG. 3), is to accentuate the tapered relationship between the end faces 28 and 29 and the cylinder wall 37, whereby contact therebetween is solely edgewise contact between the sharp edges 30 and 31 and said cylinder wall 37. Peripherally, only the lower of the ring segments is provided with an initial taper but both rings may be initially tapered or may be straight-faced, and the tapered effect accomplished solely by the use of torsion rings to give the dished result shown.

In addition to good sealing of ring segments 12 and 13 against the upper and lower radial surfaces of the piston groove at the outer periphery of said groove, there is also good sealing between the end edges 30 and 31 and the wall of the cylinder because of the good bore-conformability provided by the resilient nature of the ring segments 12 and 13 and of the circumferentially expansible ring 11.

FIGS. 4 and 5 illustrate pairs of torsion type ring segments, separate and apart from the circumferentially expansible U-shaped ring 11. In FIG. 4, the ring segments corresponding to segments 12 and 13 are given the same reference numerals, but with the subscript $a$, while in FIG. 5, the corresponding ring segments are given the subscript $b$. In FIG. 4, the ring segments 12$a$ and 13$a$ have counterbores 41$a$ and 42$a$, respectively, that are similar to the counterbores 41 and 42, but of lesser diameter. The unbalanced cross-section of said ring segments, however, is sufficient to bring about a twisting action when the ring segments are confined to truly cylindrical form, as by installation within the bore of a cylinder. The upper ring segment 12$a$ is a positive type torsion ring, while the lower ring segment 13$a$ is negative, or reverse, type torsion ring. When installed in a groove of a piston, as illustrated in FIG. 6, the ring segments 12$a$ and 13$a$ assume the relationship there illustrated. Essentially, there is no different result or function from the result and function already described in connection with FIGS. 1 to 3, inclusive, the omission of the circumferentially expansible U-shaped ring 11 notwithstanding. It will be understood, however, that said ring 11 could be employed with the ring segments 12$a$ and 13$a$ in the same manner as illustrated in FIGS. 1 to 3, inclusive. The use of the ring 11, of course, serves a useful purpose in that it facilitates the handling of the pairs of rings by holding them in assembled relationship, as in FIG. 2, prior to installation in the internal combustion engine.

Also, the U-shaped ring 11, or an equivalent ring serves as an expander to assure better conformability to the cylinder wall by exerting uniform outward radial pressure on the rings. In certain engines, where cylinder bore distortion is not a problem, or when cost of rings is a major factor, the piston rings would be "live" rings and would necessarily be of a larger cross-section than they otherwise would be, to provide inherent resilient pressure against the cylinder bore wall. With the circumferentially expansible ring 11, or its equivalent, "dead" piston rings or ring segments could be used, that is, rings having no inherent resiliency that would result in radial and circumferential expansion of the rings per se.

In FIG. 5, the ring segments 12$b$ and 13$b$ are provided with chamfers 50 and 51, respectively, instead of the counterbores 41$a$ and 42$a$ of FIG. 4, to obtain the unbalancing cross-section which causes the ring segments to twist upon assembly. Ring segment 12b is a positive and ring segment 13b a reverse torsion ring.

In view of the twisting effect upon assembly due to the use of positive and reverse torsion rings, the outer surfaces 28b and 29b of the ring segments 12b and 13b can both be straight-faced, that is, right cylindrical or normal to the planes of the planar faces 26b and 27b, or only one of the outer surfaces, such as the surface 28b of the upper ring segment 12b can be right cylindrical and other outer surface 29b can be tapered or sloping, as shown. Where a tapered outer peripheral surface is used the taper should be from approximately 0°30′ to 1°30′ and should be continuous to the edge 31b. Such an amount of taper gives line contact with the surface of the cylinder bore without any twisting of the ring segment due to a torsion effect. For most effective oil control the lower segment of each pair of ring segments should be the ring segment to have a tapered outer peripheral surface, if an initial taper is used.

The ring segments 12b and 13b can be assembled in the same manner as the segments 12a and 13a without a circumferentially expansible U-shaped ring (FIG. 6), or can be assembled the same as segments 12 and 13 in a circumferentially expansible U-shaped ring like the ring 11 (FIG. 2). Whether the ring 11 is employed or not, the pair of ring segments 12 and 13, or their corresponding parts with the subscripts a, b, c, and d, should be capable of tilting movement to accommodate the twisting or dishing effect caused by the use of torsion rings. This means that the total thickness of the head portions 22 and 23 (FIG. 2) should be less than the axial extent or height of the inwardly closed groove 35 (FIG. 3) into which the ring segments 12 and 13 are inserted. Thus, upon twisting or dishing of the ring segments, the superimposed upper and lower ring segments are tiltable about their rearwardly or inwardly line of edge contact 46 into the positions shown in FIGS. 3, and 6 to 8, wherein the outer portions of the opposed planar surfaces 26 and 27 (FIG. 3) are separated by an annular triangular space 45 that widens toward the outer peripheries of the ring segments, and wherein a sealing relationship is maintained at 43 and 44 between the upper and lower surfaces of the upper and lower ring segments, respectively, and the radially outer upper and lower portions of the planar radially extending groove walls 39 and 40, as already explained. The inclusion of the expansible ring 11 in no way interferes with this tilting movement of the ring segment or the maintenance of the sealing relationships referred to.

FIG. 7 discloses a compression ring assembly installed in an internal combustion engine, but using a slightly different form of ring segments. Corresponding elements of FIG. 7 will be given the same reference numerals and the suffix c. The upper ring segment 12c is otherwise similar to the ring segment 12 (FIGS. 2 and 3), but is provided with an outer peripheral surface 28c that is arcuate in cross-section. Similarly, the lower ring segment 13c is provided with an outer surface 29c that is arcuate in cross-section. By virtue of the unbalanced cross-section of the ring segments 12c and 13c and their dimensions, the resulting twist of the ring segments in installed position accentuates the center contact that would inherently occur because of the arcuate or tapered configuration of the surfaces 28c and 29c between the piston ring assembly and the cylinder wall. Such center contact is constituted by the outer lower edge 52 of the upper ring segment 12c and the outer upper edge 53 of the lower ring segment 13c engaging with the cylinder wall 37c. Such edge contacts compensate for piston groove misalignment and assure center face contact when misalignment due to piston clearances and machine tolerances is present. Actually the angle of taper of the outer surfaces 28c and 29c toward the cylinder wall 37c is of the order of 1 or 2° depending upon the direction of torsion, reverse torsion rings effecting a higher degree of taper than positive torsion rings.

FIG. 8 illustrates a further modified form of our compression piston ring assembly. Elements corresponding to those already described are indicated in FIG. 8 by the corresponding reference numerals with the subscript d. The ring segments 12d and 13d are similar to the ring segments 12a and 13a (FIG. 6), except that the outer peripheral surface of said ring segments are not initially tapered. Because of the unbalanced cross-section of said ring segments 12d and 13d, however, the segments assume the twisted or cooked relationship illustrated in FIG. 8, wherein the outer lower edge 54 of the upper ring segment 12d and the outer upper edge 55 of the lower ring segment 13d establish edgewise center contact with the cylinder wall 37d.

As in the case of the modification of our invention illustrated in FIG. 7 the center sealing edge contacts at 54 and 55 in FIG. 8 are slightly spaced along the axial length of the cylinder wall 37d, but the upper and lower ring segments 12d and 13d, respectively, are still in abutting relationship along their rear edges, as at 46d, and there is sealing contact toward the outer ends of the radial planar surfaces 39d and 40d of the groove 35d, as at 43d and 44d, the same as has been previously described.

It will be apparent from the foregoing description that in each case, whether the outer peripheral surfaces of the ring segments are initially tapered, or not, so long as the cross-sections of the upper and lower ring segments are unbalanced, edgewise sealing contact between the ring segments and the cylinder wall will be effected either at both the lower and upper outer surfaces, respectively, of said ring segments, as in FIGS. 3 and 6, or at or near the center portion of said assembled rings, as in FIGS. 7 and 8. In each form of our invention, also, sealing contact is effected between the ring segments and the radial planar walls of the groove of the piston adjacent the forward ends thereof to prevent oil from getting past the ring segments into the closed end portion of the groove 35 and exerting a floating effect upon the ring segments.

As already explained, the compression piston rings of our invention may be installed in pairs of superimposed ring segments with or without a circumferentially expansible U-shaped ring. As a result of such sealing action, the compression piston ring assembly of our invention provides good bore conformability and piston groove side sealing and compensates for misalignment of the piston ring groove with respect to the cylinder wall. Consequently, our compression piston ring assembly can be effectively used with low emission engines, since the aforesaid novel features of our assembly substantially eliminate any blow-by of gases and vapors.

While the compression piston rings having initially tapered outer faces that provide end or edgewise sealing against the cylinder wall have been disclosed in Patent No. 2,240,624, dated May 6, 1941, the present invention distinguishes from that patent in that it eliminates the thin, helical element there indicated by the reference numeral 4 that is nested between the tapered face ring elements 3, 3. Furthermore, the piston ring assembly of the cited patent does not result in the novel sealing features and conformability here present. Instead, the entire ring combination of the patent is free to float with the oil film serving as the buoyant medium due to the clearance provided to prevent side sealing against the radially extending upper and lower walls of the ring groove. Here, such side sealing with respect to the upper and lower walls of the closed ring groove is an important feature of our invention.

We claim as our invention:

1. A compression ring assembly for mounting in a radially inwardly closed annular groove of a piston that operates in a cylinder of an internal combustion engine, said assembly comprising a pair of separate, transversely split, radially expansible ring segments freely received in superimposed relationship in said groove with limited freedom of axial movement therein, said ring segments having radially extending surfaces including one pair of abutting surfaces and a second pair of surfaces confronting and abutting corresponding radially extending walls of said groove.

said ring segments also having outer peripheral surfaces for edgewise engagement with the wall of said cylinder, and said ring segments having radially inner relieved walls producing an unbalanced cross-section such as to cause said ring segments when confined to truly circular configuration to become twisted and assume an oppositely dished relationship with said one pair of confronting surfaces in spaced relationship at their radially outward edges and converging into abutting relationship at their radially inward edges, one of said ring segments initially having a straight-faced cylindrical outer peripheral surface.

2. A compression ring assembly as defined by claim 1, wherein
both of said ring segments initially have straight-faced cylindrical outer peripheral surfaces.

3. A compression ring assembly as defined by claim 1, wherein
only the lower of the ring segments has an initially tapered outer peripheral surface.

References Cited

UNITED STATES PATENTS

| | | | |
|---|---|---|---|
| 1,340,650 | 5/1920 | Deranek | 277—194 |
| 2,213,452 | 9/1940 | Paton | 277—176 |
| 2,459,395 | 1/1949 | Smith | 277—216 |
| 2,970,023 | 1/1961 | Thompson | 277—216 X |
| 3,031,240 | 4/1962 | Olsen | 277—176 X |

FOREIGN PATENTS

| | | |
|---|---|---|
| 140,799 | 7/1949 | Australia. |
| 918,909 | 10/1954 | Germany. |
| 1,008,072 | 5/1957 | Germany. |
| 1,099,812 | 2/1961 | Germany. |

LAVERNE D. GEIGER, Primary Examiner

JEFFREY S. MEDNICK, Assistant Examiner

U.S. Cl. X.R.

277—140, 141, 174, 194, 216